United States Patent [19]
Hiramatu et al.

[11] 3,771,802
[45] Nov. 13, 1973

[54] APPARATUS FOR CONTROLLING CHUCKING PRESSURES ON WORKPIECES IN MACHINE TOOLS

[75] Inventors: Sadakazu Hiramatu; Tomoyosi Egusa; Hiromiti Tateisi, all of Iwata, Japan

[73] Assignee: Toyo Bearing Manufacturing Company Limited, Osaka-shi, Japan

[22] Filed: May 5, 1971

[21] Appl. No.: 140,368

[30]     Foreign Application Priority Data
    Dec. 5, 1970   Japan.................... 45/107804

[52] U.S. Cl.............................. 279/4, 91/31, 91/32, 51/290, 82/1 C, 82/30
[51] Int. Cl...................... B23b 31/30, F15b 31/04
[58] Field of Search.......................... 279/4; 51/290; 91/31, 32; 82/1 C, 30

[56]            References Cited
            UNITED STATES PATENTS
3,091,256   5/1963   Becker............................... 279/4 X
2,731,952   1/1956   Szabo.................................. 91/31

*Primary Examiner*—Francis S. Husar
*Attorney*—Hall & Houghton

[57]            ABSTRACT

The present invention provides a method of and apparatus for controlling chucking pressures on workpieces in machine tools carrying out machining operations by chucking the widths, outer surfaces or inner surfaces of workpieces with hydraulic pressure, magnetic forces or mechanical force, the principal arrangement thereof being such that in order that the internal stresses in a workpiece may be dissipated or relieved in accordance with changes in the cutting speed in an automatic working cycle thereby to improve the accuracy of finishing, the chucking pressures are properly adjusted. It also provides methods of and apparatuses for controlling chucking pressures on workpieces in machine tools, having sub-arrangements based on said principal arrangement. Advantages and details of such arrangements will be made clear.

1 Claim, 10 Drawing Figures

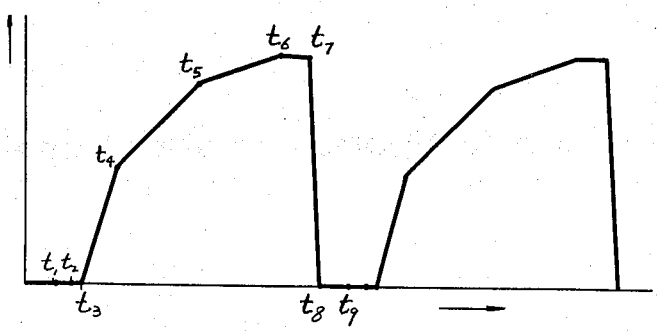
Fig 1
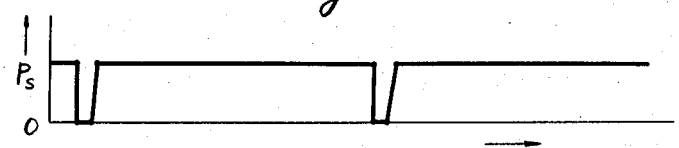
Fig 2
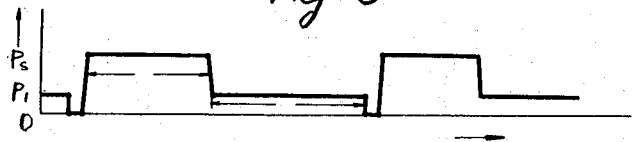
Fig 3
Fig 4
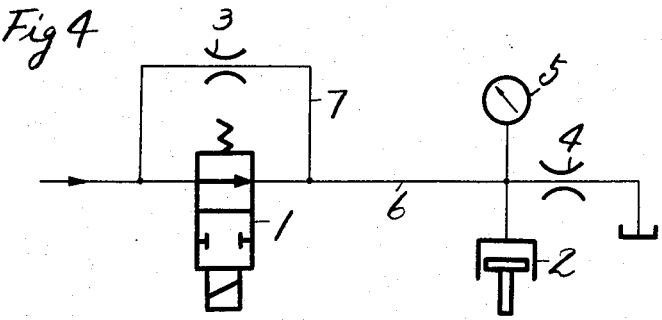
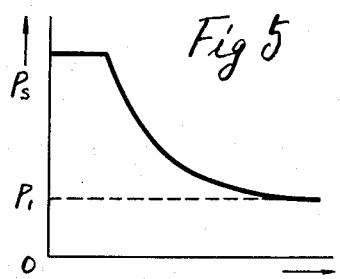
Fig 5
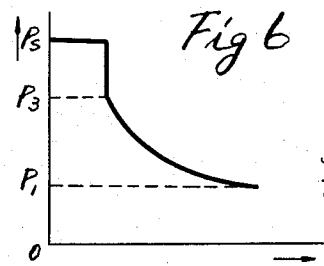
Fig 6
SADAKAZU HIRAMATU,
TOMOYOSI EGUSA,
HIROMITI TATEISI,
INVENTORS
BY Hall & Houghton
Attorney.

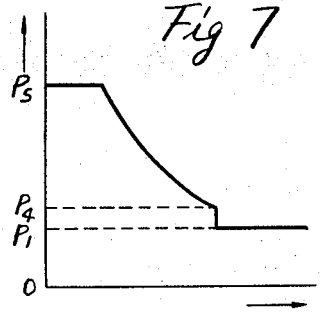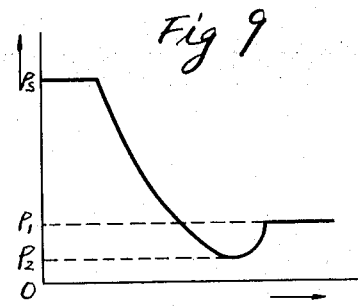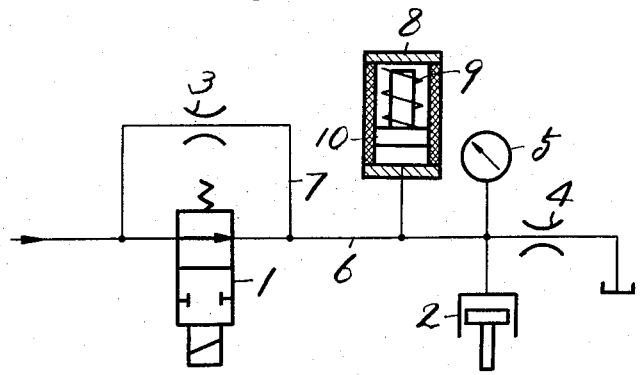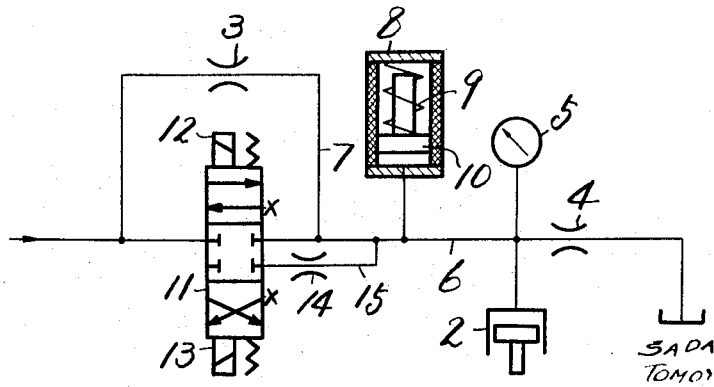

3,771,802

APPARATUS FOR CONTROLLING CHUCKING PRESSURES ON WORKPIECES IN MACHINE TOOLS

BACKGROUND OF THE INVENTION

*a. Field of the Invention*

The present invention relates to a method of and apparatus for controlling chucking pressures on workpieces in machine tools.

*b. Field of the Prior Art*

In machine tools which carry out machining operations by chucking the outer diameters, inner diameters or widths of annular workpieces with hydraulic pressure, pneumatic pressure or magnet pressure, e. g., internal grinders, if machining under heavy cutting load, i. e., rough grinding is to be effected, it is necessary to chuck the workpiece with a sufficiently strong chucking pressure to withstand it. Chucking of the workpiece with a high chucking pressure, however, produces internal stresses in the workpieces. Besides this, during machining operation, additional internal stresses due to machining will be produced. Therefore, if such high chucking pressure is maintained until the completion of machining, upon removal of the workpiece said internal stresses will appear in the form of the deformation, contraction or expansion of the workpiece.

Machine tools of this type which are now on the market are designed to chuck workpieces with a constant chucking pressure, as seen in FIGS. 1 and 2. This will now be described in more detail with reference to FIGS. 1 and 2.

Supposing that a machined workpiece is released at $t_1$, the chucking pressure naturally becomes zero. After the lapse of a predetermined period of time, a fresh workpiece is chucked at $t_2$, whereupon the chucking pressure becomes $P_s$. During $t_3 \to t_4$, a grinding wheel or cutter is quickly applied to the workpiece, followed by rough machining during $t_4 \to t_5$, finish machining during $t_5 \to t_6$, sparking out during $t_6 \to t_7$, quick withdrawal of the grinding wheel or cutter during $t_7 \to t_8$ and, after the lapse of a predetermined period of time from $t_8$, release of the workpiece at $t_9$. Thus, the chucking pressure is maintained constant at $P_s$ from the time the workpiece is chucked at $t_2$ until the time it is released at $t_9$.

In short, since said machine tools now on the market chuck a workpiece with a constant pressure throughout the cycle as described above, when finish machining is operated after heavy duty machining (grinding), internal stresses naturally remain in the workpiece, causing the drawback that the accuracy of machining is low.

SUMMARY OF THE INVENTION

The present invention depends on chucking during rough machining operation a workpiece with a high pressure suitable for rough machining, and then switching the chucking pressure over to a low pressure suitable for finish machining at the same time as rough machining is completed, so that the internal stresses produced during rough machining and the internal stresses due to the high pressure are dissipated or relieved, in which condition finish machining is operated thereby improving the final accuracy of the workpiece, and provides improved apparatus for so doing as well as an improved process for so doing.

BRIEF DESCRIPTION OF THE DRAWINGS

FIG. 1 is a working cycle diagram for an annular workpiece working machine (grinder). FIG. 2 is a conventional chucking pressure diagram in said cycle. FIGS. 3, 5, 6, 7 and 9 are chucking pressure diagrams in said cycle for machine tools (grinders) according to the present invention. FIGS. 4, 8 and 10 are diagrams of apparatus embodying the invention.

DESCRIPTION OF THE PREFERRED EMBODIMENTS

The present invention relates to a method of and apparatus for controlling chucking pressures characterized by adjusting chucking pressures in accordance with changes in cutting speed in an automatic working cycle.

FIG. 3 shows a method of controlling chuckling pressures by apparatus of the invention. In this method, during rough machining, the chucking pressure is $P_s$ and upon completion of rough machining it is lowered to $P_1$, which is maintained until release of the workpiece, during which time finish machining is operated.

The above-mentioned chucking pressure may be applied in any desired form, such as fluid pressure, electromagnetic force and mechanical force.

An example in which fluid pressure is utilized will now be described.

In FIG. 4, the numeral 1 denotes a chuck pressure changeover valve; 2, a chuck cylinder; 3 and 4, pressure-reducing throttling valves; 5, a pressure gauge; and the numeral 6 denotes a main line. In this circuit, when fluid is fed to the main line and the chuck pressure changeover valve 1 is opened, the primary line becomes maintained at set pressure, i. e., a chuck pressure $P_s$ suitable for rough machining, by means of the pressure-reducing throttling valve 4 disposed in the main line 6 and this fluid pressure acts on the chuck cylinder 2. Naturally, thenceforth the chuck pressure is maintained at $P_s$. In this condition, rough machining is operated. At the same time as rough machining is completed, the chuck pressure changeover valve 1 is closed. Thenceforth, the fluid flows through the pressure-reducing throttle valve 3 disposed in a branch line 7 and then flows into the main line 6. Therefore, the secondary side of the pressure-reducing throttling valve 3 becomes maintained at $P_1$ suitable for finish machining by means of the pressure-reducing throttling valve 3. Thenceforth said pressure is maintained at $P_1$ until the flow in the main line 6 is interrupted.

FIGS. 5 through 7 show other embodiments of the method of controlling chucking pressures by apparatus of the present invention, wherein at the same time as rough machining is completed, the chucking pressure is gradually lowered to $P_1$ and finish machining is operated at this chuck pressure $P_1$.

That is, this method is an improvement on the first method described above. In the first method, at the same time as rough machining is completed, the chuck pressure $P_s$ is quickly lowered to the finish chuck pressure $P_1$. With this, however, in the case of an annular workpiece, there is a danger of causing misalignment. If misalignment occurs, the workpiece could collide with the grinding wheel or cutter. It is this second method that has overcome such drawback.

The chuck pressure in said second method may be in any desired form, such as fluid pressure, electromagnetic force and mechanical force.

In embodying the second method, an example in which fluid pressure is utilized will now be described with reference to FIG. 8.

FIG. 8 is an addition of an accumulator 8 to the main line 6 between the branch line 7 and chuck cylinder 2 in the circuit described in connection with the first method, the rest of the arrangement being the same as in FIG. 4. In this circuit, when fluid is permitted to flow in the main line 6 and the chuck pressure changeover valve 1 is opened, the supplied fluid passes through the chuck pressure changeover valve 1 and reaches the chuck cylinder 2. The pressure at this time is the pressure $P_s$ suitable for rough machining set by the pressure-reducing throttling valve 4.

When the chuck pressure changeover valve 1 is opened, part of the fluid flowing through the main line 6 is stored in the accumulater 8. That is, a fluid pressure corresponding to the pressure $P_s$ is stored in the accumulator 8 by pushing up a piston 10 against the force of a spring 9. In this condition, if the chuck pressure changeover valve 1 is closed upon completion of rough machining, the fluid passes not through the chuck pressure changeover valve 1 but through the pressure-reducing throttling valve 3 in the branch line 7 and is then exhausted through the other pressure-reducing throttling valve 4. However, the closing of the chuck pressure changeover valve 1 causes the fluid stored in the accumulator 8 to be discharged to the main line 6. The process of this discharge is shown in FIGS. 5, 6 and 7 wherein the pressure changes from $P_s$ to $P_1$, that is, upon completion of rough machining the pressure is gradually lowered to $P_1$ suitable for finish machining. This pressure change may be made in the manner shown in FIG. 5, 6 or 7, as desired, by suitably designing the spring 9 housed in the accumulator.

A third method is used in cases where the strains in the annular workpiece cannot be released except at pressure $P_2$ which is lower than the chuck pressure $P_1$ for finish machining. Thus, according to the third method, as shown in FIG. 9, upon completion of rough machining, the pressure is gradually lowered to $P_2$ which is lower than the chuck pressure $P_1$ suitable for finish machining and thereafter it is gradually raised to the chuck pressure $P_1$, at which finish machining is then operated. FIG. 10 shows an embodiment of the third method, which is a modification of the embodiment of the second method (FIG. 8), wherein the chuck pressure changeover valve 1 is replaced by a threeway changeover valve 11 and additional provision is made of a branch line 15 having a pressure-reducing throttling valve 14, the rest of the arrangement being the same as in FIG. 8. In this circuit, when one solenoid 12 of the three-way changeover valve 11 is actuated, the pressure in the chuck cylinder 2 becomes maintained at the pressure $P_s$ suitable for rough machining, as in the case of the first and second methods. In this case, the interior of the accumulator 8 is also at the pressure $P_s$. Next, when the solenoid 12 is interrupted, the fluid passes through the pressure-reducing throttling valve 3 in the branch line 7 and is exhausted through the other throttling valve 4. Simultaneously therewith, the fluid in the accumulator 8 is discharged, so that the pressure is gradually lowered until it reaches the pressure $P_2$ which is lower than the finish machining chuck pressure $P_1$. When the pressure reaches $P_2$, the other solenoid 13 is actuated to feed the main line 6 with fluid from both of the pressure-reducing throttling valves 3 and 14, whereby the pressure changes from $P_2$ back to $P_1$. Thereupon, finish machining is operated at the desired finish chuck pressure $P_1$.

Whiles there have been described herein what are at present considered prefered embodiments of the several features of the invention, it will be obvious to these skilled in the art that modifications and changes may be made without departing from the essence of the invention.

It is therefore to be understood that the exemplary embodiments thereof are illustrative and not restrictive of the invention, the scope of which is defined in the appended claims and that all modifications that come within the meaning and range of equivalency of the claims are intended to be included therein.

We claim:

1. An apparatus for controlling chucking pressures on workpieces comprising, in combination:
    a. a pressure operated chuck cylinder,
    b. a fluid pressure line connected thereto,
    c. a source of fluid pressure,
    d. a chuck pressure change-over valve connected between said source and said line and operable to admit fluid pressure from said source to said line,
    e. a pressure indicator connected to said line,
    f. a first pressure-reducing throttling valve connected to said line for providing throttled discharge of fluid pressure from said line for establishing a first chucking pressure in said line when said change-over valve is opened to admit fluid pressure from said source to said line,
    g. means comprising a second pressure-reducing throttling valve connected to said source and to said line in parallel with said change-over valve for supplying fluid at reduced pressure to said line for establishing in said line with said first throttling valve a second chucking pressure less than said first chucking pressure when said change-over valve is closed,
    h. a pressure accumulator connected to said line for regulating the rate of pressure change therein when said change-over valve is closed, for inhibiting misalignment of the work thereby,
    i. a third connection from said source to said line, said third connection comprising in series therein a cut-off valve and a third throttling valve, and
    j. said first, second and third throttling valves and accumulator constituting means operable for causing the pressure in said line to drop to a pressure lower than said reduced pressure when said change-over valve and cut-off valve are closed for relieving strains in the work, and operable for causing the pressure in said line to thereafter rise to said reduced pressure when said cut-off valve is opened.

* * * * *